H. MILLER.
DRIVING ATTACHMENT FOR CARS.
APPLICATION FILED JULY 26, 1915.
1,195,380.
Patented Aug. 22, 1916.
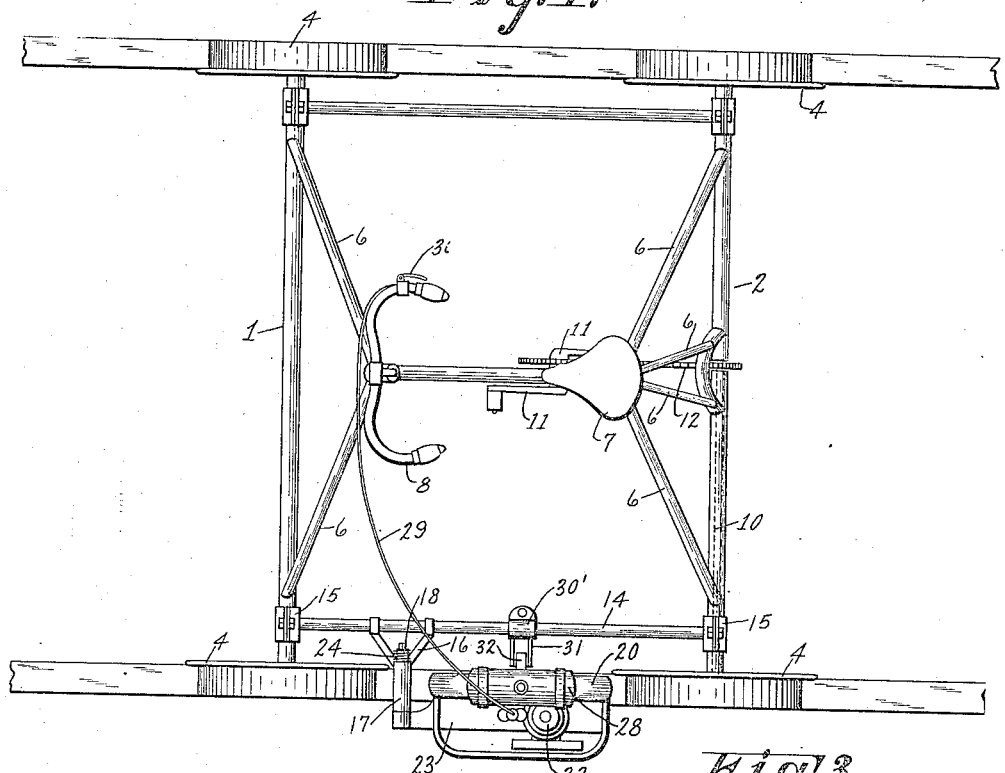
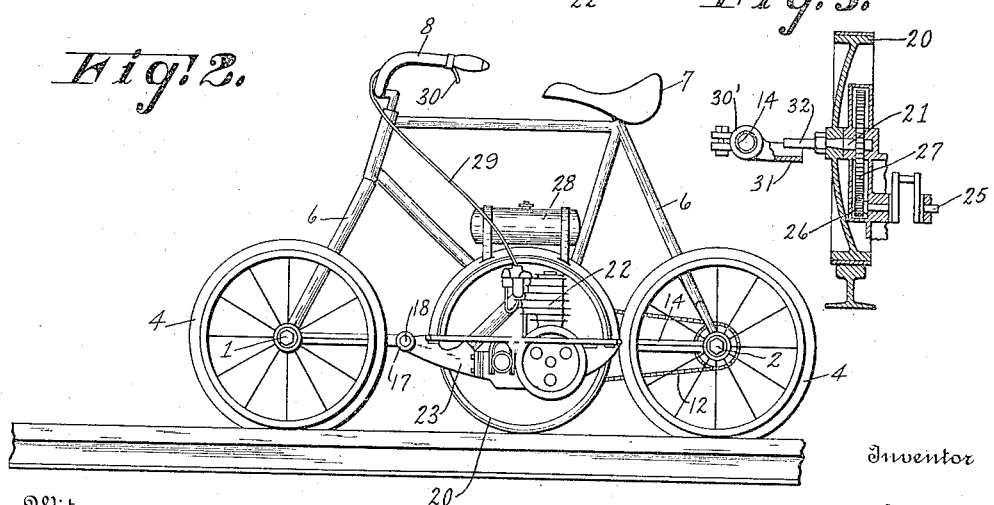
Witnesses
Elmer H. Luedcke
I. D. Bremer
Inventor
Henry Miller
By Erwin & Wheeler
Attorneys

UNITED STATES PATENT OFFICE.

HENRY MILLER, OF MILWAUKEE, WISCONSIN, ASSIGNOR TO A. O. SMITH COMPANY, OF MILWAUKEE, WISCONSIN, A CORPORATION OF WISCONSIN.

DRIVING ATTACHMENT FOR CARS.

1,195,380.

Specification of Letters Patent.

Patented Aug. 22, 1916.

Application filed July 26, 1915. Serial No. 41,844.

*To all whom it may concern:*

Be it known that I, HENRY MILLER, a citizen of the United States, residing at Milwaukee, county of Milwaukee, and State of Wisconsin, have invented new and useful Improvements in Driving Attachments for Cars, of which the following is a specification.

My invention relates to improvements in driving attachments for inspection cars, or so called hand cars.

The object of this invention is to provide a motor driven tractor attachment for inspection cars of that type heretofore commonly used upon railways and propelled by foot or hand power, said attachment including a traction wheel upon which the driving motor is preferably directly mounted, the whole attachment being capable of such adjustment, when out of use, that it will not affect the operation of propelling the car by foot or hand power, nor the operation of lifting and removing the car from the track, although there is of course a slight addition to the total weight.

In the drawings—Figure 1 is a plan view of an inspection car embodying said invention. Fig. 2 is a side elevation of the same. Fig. 3 is a central vertical sectional view of the tractor wheel, showing the axle in full, but with the driving motor or engine removed.

Like parts are identified by the same reference characters throughout the several views.

The ordinary inspection car comprises a set of front and rear supporting axles 1 and 2 provided with wheels 4 adapted to run upon a railway track. The front and rear supporting axles are connected by a suitable frame formed of a set of frame rods 6, organized to produce a structure somewhat similar to the frame of a bicycle and adapted to support a saddle 7 and a set of handle bars 8. A driving axle 10 is connected with the rear wheels 4 and is adapted to be manually driven from a crank shaft 11 by a sprocket chain 12 in substantially the same manner that a bicycle is driven. All of these parts may be of any ordinary construction and therefore do not require detailed description.

To facilitate connecting my improved motor driven attachment, I connect the supporting axles 1 and 2 near one side of the car by means of an auxiliary frame rod 14, the front and rear ends of which are secured to the supporting axles 1 and 2 respectively by clamping members 15. A bracket 16 projects laterally from the auxiliary frame rod 14 and supports a sleeve 17, preferably a horizontal sleeve which is adapted to receive a pivot bolt 18.

A traction wheel 20 is provided with an axle 21 rigidly secured thereto, and a motor 22 is journaled upon this axle. The motor frame has a forwardly projecting arm 23, the extremity of which is pivotally connected with the outer end of the pivot bolt 18. The inner end of the bolt is preferably provided with a cushion spring 24 which allows a slight longitudinal movement of the bolt in the sleeve 17 which provides a supporting bearing for this pivot bolt. The motor is preferably an internal combustion motor. It may be of any ordinary type and therefore is not specifically described. The motor shaft 25 may be connected with the axle 21 of the wheel 20 by gear wheels 26 and 27, as shown in Fig. 3.

28 is a tank for liquid fuel and 29 is a flexible controlling rod extending to a controlling lever 30 mounted upon one of the handle bars 8.

The positions of the bracket 16 and sleeve 17 are such as to support the traction wheel 20 in alinement with the supporting wheels 4 of the inspection car on that side of the vehicle at which the traction wheel is located. The traction wheel is also preferably supported between the front and rear wheels 4 and its rim is formed to run upon the track rail upon which such wheels 4 are adapted to travel, but owing to the fact that the motor frame is pivotally supported from the sleeve 17 and is therefore adapted to swing in a vertical plane, it is obvious that the motor wheel is entirely relieved from the weight of the inspection car and is free to conform to all inequalities of the track. It is also obvious that the tractive effect will be uniform, since the weight of the motor and the associated parts, including the traction wheel 20, is uniform. The downward movement of the motor is however limited by a bracket 30 having a cup shaped projecting arm 31 which extends underneath a stud 32 carried by the wheel 20 and projecting axially therefrom. This stud 32 may be a continuation of the axle 21 of the traction wheel, if desired. Normally it is not in contact with the cup shaped rest 31. The latter is located a sufficient distance below this stud so that it will not interfere with the movements of the traction wheel in conforming with the surface of the track upon which it runs. But when the inspection car is lifted for the purpose of removing it from the railway track, this cup shaped bearing member 31 will engage underneath the stud 32 and will thus support the traction wheel and motor from further relative downward movement with reference to the inspection car frame. The traction wheel 20 will therefore be retained in position for engagement with any surface upon which the wheels 4 may be placed. The attachment will require no attention whatever when the inspection car is replaced upon the track, since the traction wheel 20 will register with the track rail whenever the wheels 4 of the inspection car are in registry therewith.

The bracket 30 is adjustably connected with auxiliary frame rod 14 so that the bearing member 31 may be raised or lowered at pleasure. It is therefore obvious that in case it is desired to propel the inspection car manually, the traction wheel may be lifted and supported out of contact with the track rail by swinging it on pivot bolt 18 to a raised position and then adjusting the bracket 30 with the rest 31 in a sufficiently raised position to prevent the traction wheel 20 from returning by gravity to the track rail.

The foregoing description is not intended to limit the scope of my invention to the specific structure and arrangement shown and described, nor to any specific location of the auxiliary traction wheel with reference to the supporting wheels of the vehicle, except that for railway inspection cars it is of course essential that the traction wheel shall be in position to register with one of the railway rails, but it is not essential that it should be located between the front and rear wheels of the car which it propels. It is also obvious that it is not essential to my invention whether the motor wheel is adjusted vertically or laterally out of registry with the track rail when not in use, although I prefer the vertical adjustment as the most convenient in the illustrated embodiment of my invention.

I claim:

1. The combination with a railway car, of an auxiliary frame rod connecting the front and rear supporting axles thereof, a bracket secured to said frame rod, a motor frame pivotally connected with said bracket, a motor carried by said frame, a traction wheel supporting the motor and frame and operatively connected to be driven by said motor, said traction wheel being adjusted for operation in registry with the track along which said car travels.

2. A railway car having a frame provided with supporting wheels and connections for driving the same manually, in combination with an auxiliary traction wheel, a motor carried thereby and operatively connected to drive the same, a pushing arm pivotally connecting the traction wheel with the car frame and adapted to support said traction wheel in registry with one of the track rails along which said car travels, a laterally projecting rest on the car frame, and a coöperating projection normally supported by the traction wheel slightly above said rest and adapted to engage the rest when the car is lifted from the track to prevent the traction wheel from dropping materially below the supporting wheels.

3. The combination with a railway car, of a motor carrying traction wheel adapted to drive said car, means for supporting the traction wheel out of driving relation to said car, and means for operating said car manually when the traction wheel is so supported.

4. The combination with a car having front and rear supporting axles, of a frame rod connecting said axles, a bracket secured to the frame rod, a motor having a frame pivotally connected with said bracket, and an auxiliary traction wheel operatively connected with the motor to be driven therefrom and adapted to support the motor frame and motor, means for operating the car manually, and means for relieving the car of the resistance of the motor and auxiliary traction wheel during manual operation of the car.

5. The combination with a car having front and rear supporting axles, of a frame rod connecting said axles, a bracket secured to the frame rod, a motor having a frame pivotally connected with said bracket, and an auxiliary traction wheel operatively connected with the motor to be driven therefrom and adapted to support the motor frame and motor, said traction wheel being independent of the supporting wheels of the vehicle, and said supporting wheels adapted to drive the car independently of the auxiliary traction wheel.

6. The combination with a car having front and rear supporting axles, of a frame rod connecting said axles, a bracket secured to the frame rod, a motor having a frame pivotally connected with said bracket, and an auxiliary traction wheel operatively connected with the motor to be driven therefrom and adapted to support the motor frame and motor, said traction wheel being independent of the supporting wheels of the vehicle and said vehicle being provided with means for supporting the traction wheel in a raised inoperative position, whereby it may be carried by the vehicle when the motor is not in operation.

7. An auxiliary driving attachment for cars, comprising the combination of a traction wheel, a motor carried thereby, a supporting and actuating connection between the traction wheel and car, and means for relieving the car of the resistance of the motor when the latter is not in operation, whereby the car may be manually propelled when the motor is not in use.

8. The combination with a car, of an auxiliary frame member, a motor carrying traction wheel connected with the frame member and supported thereby in alinement with the path along which one of the wheels of the car travels.

9. A driving attachment for cars, comprising the combination with the supporting wheels, of an auxiliary wheel adapted to drive the car, a motor supported by the auxiliary wheel in actuating relation thereto, means for relieving the car of the resistance of the motor when the latter is not in operation, and means for manually propelling the car independently of the motor.

10. The combination with a car, of a motor frame connected with the car upon a substantially horizontal pivot axis, a motor, a traction wheel supporting the motor and frame and operatively connected to receive power from the motor, and means for adjustably limiting the downwardly swinging movement of the traction wheel upon said pivotal connection.

In testimony whereof I affix my signature in the presence of two witnesses.

HENRY MILLER.

Witnesses:
LEVERETT C. WHEELER,
J. J. STAMM.